United States Patent Office 3,284,223

Patented Nov. 8, 1966

3,284,223
MAGNETIC RECORDING TAPE SUPPORTED ON TEREPHTHALATE POLYESTERS OF 1,4-CYCLOHEXANEDIMETHANOL

Marshall T. Watson and William D. Kennedy, Kingsport, Tenn., assignors to Eastman Kodak Company, Rochester, N.Y., a corporation of New Jersey No Drawing. Filed May 19, 1965, Ser. No. 457,154
6 Claims. (Cl. 117—7)

This application is a continuation-in-part of earlier application, Serial No. 90,958, filed February 23, 1961, now abandoned.

This invention relates to a magnetic recording tape comprising a film support and an adherent layer consisting of magnetizable particles dispersed in a binder. More particularly, the invention relates to a support composed of a polymer obtained by condensing 1,4-cyclohexanedimethanol with one or more bifunctional reactants such as dicarboxylic acids and more specifically with terephthalic acid and isophthalic acid.

Magnetic sound and video recording tapes are known to comprise magnetizable particles dispersed throughout a nonmagnetic binder in the form of a thin layer coated on a flexible supporting film or web. Commercial tapes are available in which the supporting film is either cellulose acetate, poly(vinyl chloride), or an oriented film of poly (ethylene terephthalate). Although such tapes are in wide commercial use, they are known to have certain deficiencies.

It is one of the objects of this invention, to overcome these deficiencies and to produce a new and improved magnetic recording tape which is distinguished from the magnetic tapes of the prior art, not only by the chemical constitution of the supporting film, but also by certain unexpectedly improved physical properties.

One requirement for a magnetic tape support is a reasonably high tensile strength in the lengthwise direction because of the fact that inertial effects in handling tapes can cause excessive tensions.

If the inertial circumstances and the tape properties are not such as to permit the supply and take-up reel speeds to equalize by the time the tape has elongated elastically to its maximum extent, then the tape must either break or undergo permanent elongation. The importance of the difference in which either of these two events takes place, i.e., breakage or permanent elongation, is that a tape which has been used to make a recording and then broken or cut cleanly can be spliced with no loss or deterioration of program material. A permanently stretched length of tape, on the other hand, is ruined and must be cut out; furthermore, this initial deformation may lead to further deformation along the length of the tape. Consequently, for both professional and amateur sound tape recording, the preferred behavior under any conditions of excessive stress is for the tape to break without elongating. This behavior is characteristic of cellulose acetate tapes, whereas oriented poly(ethylene terephthalate) tapes tend to elongate first and then break.

It can be appreciated further that the inertial effects producing high tensions, such as described above, represent conditions under which the tape is stressed at a very high rate, that is to say, it is suddenly jerked. It is thus obvious that in order to evaluate a magnetic tape, it is necessary to make tensile tests at very high loading rates. The usual tensile testing rate for films having an ultimate elongation of 20–100% is prescribed by the American Society for Testing Materials in its test method D882–56T as a grip separation of 2 inches per minute using a specimen of 2 inches gage length, corresponding to an initial strain rate of 100% per minute. To simulate actual conditions to which magnetic tape might be subjected, however, tests should be run at loading rates many times this rate. It is a novel and unexpected finding of this invention that tapes produced by the practice of the invention, not only have very high lengthwise tensile strength in tests at ordinary testing rates, i.e., 50–100% per minute, but also have unexpectedly improved tensile strengths at high testing rates compared to one of the best known commercial audiotapes in which the tape support is oriened poly(ethylene terephthalate) film.

A further advantage of tapes produced in accordance with the instant invention compared to those of the prior art is that the tapes of the invention have a relatively low permanent elongation after break, especially at high testing speeds. Whereas known magnetic tapes using oriented poly(ethylene terephthalate) as the support have elongations at break as high as 100%, or even higher, tapes produced under the practice of the instant invention have elongations which are usually less than one half of that which would characterize a tape made in the same manner from poly(ethylene terephthalate). It is a distinct advantage that a magnetic tape have a low permanent elongation after break, in order that broken tape, after splicing, may reproduce sound as closely as possible to the sound of the original unbroken tape.

Another desirable property of magnetic tape is a high lengthwise tensile modulus. At a given cross sectional area, the higher the lengthwise modulus of the tape, the greater is its resistance to elastic change of length under various tensions. It is readily appreciated that any tape deformation while it is under tension during playback would result in undesirable sound distortions, for example, amplitude modulation as a result of periodic lifting away of the tape from the head. Under the practice of this invention, films are produced having a high lengthwise modulus; again, these films have unexpectedly improved modulus at high testing rates compared to commercial magnetic tape on poly(ethylene terephthalate) support.

It is a further object of this invention to provide a magnetic recording tape having excellent dimensional stability under conditions of varying temperature and humidity and having high tensile strength and high modulus in the lengthwise direction.

Another object is to provide unexpectedly improved magnetic recording tape having excellent dimensional stability under conditions of varying temperature and humidity and having (1) lower elongation at break, (2) higher elongation at yield, and (3) higher widthwise modulus.

An additional object is to provide a magnetic recording tape which is extremely resistant to dimensional changes with time under load (very low creep under load) and which undergoes extremely low permanent deformation after loading followed by load removal (very low residual creep after load removal).

Another object is to provide a magnetic recording tape in which the supporting material is of such a chemical nature as to permanently receive a binding layer containing the magnetic particles without the necessity of first priming or subbing the support for the deposition of this layer.

Other objects will appear hereinafter.

According to one embodiment of this invention a polyester can be produced in known manner, as by the process disclosed in Kibler, Bell and Smith U.S. Patent 2,901,466, by condensing 1,4-cyclohexanedimethanol with terephthalic acid, preferably in the form of the dimethyl ester thereof. Such a polyester can be produced by condensing dimethyl terephthalate with 1,4-cyclohexanedimethanol wherein up to 25 mole percent of the total molar amount of the dimethyl terephthalate can be replaced with another diester of a dibasic acid such as isophthalic, phthalic, succinic, sebacic, adipic, azelaic, carbonic, suberic, pimelic, glutaric, etc., and up to 25 mole percent of the total molar amount of 1,4-cyclohexanedimethanol can be replaced with a second glycol, such as ethylene glycol, 1,3-propanediol, 1,4-butanediol, neopentyl glycol, etc. Such polyesters are linear high melting polyesters essentially derived by condensing 1,4-cyclohexanedimethanol with a dicarboxylic acid essentially composed of terephthalic acid. They are polyesters of essentially equimolar proportions of 1,4-cyclohexanedimethanol and a dicarboxylic acid essentially composed of terephthalic acid (may be replaced by up to 25 mole percent with isophthalic acid or the like).

A polyester, as just described, can be heated to its melting point and the molten material extruded in a substantially amorphous condition in the form of a thin film onto the surface of a highly polished metal quenching roll or other appropriate film-forming surface. The amorphous polymer can then be stretched in the lengthwise direction from about 2.5 to about 5.5 (preferably 3.5 to 4.5) times its original length and can then be adjusted advantageously in the transverse or widthwise direction anywhere from about 0.95 to about 1.3 (preferably about 1.0 to about 1.1) times its original width, i.e., from about zero stretch (or slightly contracted in width) up to about a 30% stretch. The stretched film is thereafter advantageously subjected to a heat-setting or crystallizing treatment at a temperature usually above about 150° C. and up to as high as about 250° C. or more in some cases, preferably 180°–230° C. Tentering of plastic material is illustrated in U.S. Patent 2,823,421.

The film can then be coated with a nonmagnetic binder in which are dispersed magnetizable particles of $Fe_2O_3$ or similar magnetically susceptible material.

In making a magnetic recording tape, in accordance with one embodiment of the invention, a magnetically susceptible material such as magnetic iron oxide ($Fe_2O_3$) may be prepared by grinding the oxide to a suitable degree of fineness in a ball mill or other grinding device in a manner well known in the art. The iron oxide particles are then distributed in a nonmagnetic coating medium such as a solution of poly(vinyl chloride-acetate) in methyl isobutyl ketone, and containing a small amount of oleic acid, and this composition coated on the polyester support and distributed evenly thereon as by means of a doctor blade or similar device, as is well known in the film coating art. The final sheet may have any desired or convenient width and a thickness between about 0.5 to about 5 mils.

According to one embodiment of this invention the magnetic tape support as described herein can be successfully coated with the magnetic binder without the necessity for pre-coating the support with sublayers, the chemical and physical characteristics of the support material being such as readily to permit the deposition and adhesion of the magnetic layer without requiring subbing or other cumbersome and costly expedients usually necessary to obtain the adhesion of such layers to film made from many other supports.

Having set forth above a general description of this invention and how a magnetic tape may be made in accordance therewith, the following specific examples and description will further serve to illustrate the invention, but are not intended as a limitation thereof.

EXAMPLE 1

A high-melting linear polyester was prepared in accordance with the disclosure of U.S. Patent 2,901,466 by condensing terephthalic acid, isophthalic acid and 1,4-cyclohexanedimethanol in molar ratios of 5:1:6. The polyester in granular form was introduced into a heated extrusion machine, such as is well known in the art, and melted by being subjected to a temperature of 290° C. The molten polyester was extruded through a heated die in the form of a thin sheet or film at a temperature of 290° C. and then conveyed to the surface of a polished quenching roll where it was brought to a temperature of approximately 80° C. The quenched sheet, in substantially completely amorphous and unoriented condition, was stripped from the quench roll by an internally cooled strip roll and thus cooled to a temperature of about 25° to 40° C. The sheet was then passed between the nip of a set of polished feed rolls and thence between the nip of a second set of rolls (stretched rolls) operating at a higher linear speed than the first set of rolls so as to stretch the film longitudinally 4.1 times the length the sheet would have had if the two sets of rolls were operating at the same linear speed. During the passage of the sheet from the first set of rolls to the second set of rolls, the film was subjected to a temperature sufficient to keep it in a somewhat soft and stretchable condition.

Upon emerging from the second set of rolls, the sheet was cooled to a temperature of approximately 25° C. and then conveyed to and fastened in known manner to a heated enclosed tenter such as that described above. Upon entering the tenter the sheet was first heated without transverse stretching to a temperature of 100° C. for a run of approximately 5 feet, followed by stretching transversely to 1.02 times its original width (the width the sheet had upon entering the tenter) during a run of 20 feet of the tenter. The transverse stretching operation was then followed by a nonstretching run of the tenter a distance of 45 feet during which the sheet was subjected to a heat-setting or crystallizing temperature of about 225° C., i.e. about 220°–230° C. The film, upon emerging from the tenter, was cooled, the edges of the film were trimmed off, and the trimmed film was wound on a take-up roll in known manner.

The film support, prepared as just described, was then coated with a nonmagnetic binder containing magnetizable particles of $Fe_2O_3$, said coating material having the following composition:

| | Parts by weight |
|---|---|
| Poly(vinyl chloride-acetate) | 30 |
| Oleic acid | 3 |
| Methyl isobutyl ketone | 150 |
| Magnetic $Fe_2O_3$ | 100 |

The binder containing the magnetizable particles was applied by spreading the solution on the polyester sheet or support and "doctoring" with a doctor blade to produce a final coating thickness after drying of 0.3 to 0.5 mil. The dried coated film was then heated for one minute at a temperature of 115° C. to 120° C. to give an excellent sound recording tape.

The magnetic tape, produced at just described, has outstanding and unexpected physical properties which render it particularly adaptable for use as recording tape in various types of sound recording apparatus. The product is distinguished from all other known recording tapes in that it has extremely high dimensional stability under varying conditions of humidity and temperature, excellent tensile strength and high modulus in the lengthwise direction, not only at the usual testing speeds, but also at much higher than the usual testing speeds. It also is extremely resistant to dimensional changes with time under load (very low creep under load) and has extremely low permanent deformation after load followed by load removal (very low residual creep after load removal) and a low permanent elongation after break, particularly at high testing speeds. Several of these properties will be evident from the following data obtained from tests of the magnetic tape supports of the instant invention in comparison with a well-known commercially available magnetic tape support.

The rate of loading in these tests corresponded to an initial strain rate of 50% per minute. The film prepared in accordance with the instant invention was about 1.3 mils thick and the commercial poly(ethylene terephthalate) tape was 1.5 mils thick. Results of these tests are summarized under paragraph A in Table 1 below.

Specimens of the same two above films, ½-in. wide were also tested in the lengthwise direction in a Model TTB Instron tester, as described above, except that a gage length of 1.6 inches and a rate of grip separation of 20 inches per mniute were used. This rate of grip separation is the maximum possible with the TTB Instron testing machine and a gage length of 1.6 inches was used as the minimum gage length, which it was believed would still permit a reasonably accurate determination of the apparent Young's modulus in tension. The effect of decreasing gage length on the tensile modulus of thin plastic films is discussed, for example, by J. R. Olson and D. W. Vanas in ASTM Bulletin, No. 219, pp. 34–35, January 1957. The conditions used in these tensile tests thus corresponded to an initial strain rate of 1,250% per minute. Results of these tests are summarized under paragraph B in Table 1 below.

The novel and unexpected improvement in tensile modulus, yield strength, and tensile strength of the tape of the instant invention at the higher testing rate constitutes a distinct advantage for magnetic tape especially since at the higher testing rate these properties are of lower values for commercial magnetic tape having a poly(ethylene terephthalate) support than they are for this later tape at the lower testing rate.

The fact that the film or support of the invention has a lower elongation at break at both testing speeds than does the commercial magnetic tape also constitutes a distinct advantage for the former, insofar as these results are indicative of a lower permanent elongation after break for the tape of the invention.

*Table 1.—Lengthwise tensile properties*

| | Tape of Invention | Commercial Magnetic Tape on Poly(ethylene terephthalate) Support |
|---|---|---|
| A. Testing rate, 50%/min.: | | |
| Tensile modulus, $10^5$ p.s.i. | 7.5 | 7.6 |
| 2% offset yield, strength, p.s.i. | 14,300 | 16,300 |
| Tensile strength, p.s.i. | 41,600 | 33,500 |
| Elongation at break, percent | 31 | 137 |
| B. Testing rate, 1,250%/min.: | | |
| Tensile modulus, $10^5$ p.s.i. | 8.3 | 6.9 |
| 2% offset yield strength, p.s.i. | 17,400 | 15,900 |
| Tensile strength, p.s.i. | 45,500 | 29,000 |
| Elongation at break, percent | 30 | 142 |

As a further demonstration of the unexpected advantage of the films of this invention under highloading rates, a tape approximately 0.9 mil thick was prepared similarly to that described above and was coated with a thin layer of a nonmagnetic binder throughout which were dispersed magnetizable $Fe_2O_3$ particles. This coated film was then slit to a ¼-inch width. Composite tensile specimens of the tape of the invention and of a commercial ¼-in.-wide magnetic tape having a 1-mil-thick poly (ethylene terephthalate) support were clamped together end-to-end with a small rubber-faced hose clamp. A total gage length of 1 in. was used (½-in. gage length of each film in the composite specimen), and the composite specimen was then tested in an Instron tester at a rate of grip separation of 20 in. per minute. The test thus corresponded to an initial loading rate of 2,000% per minute. For six different composite specimens prepared and tested in this way, the commercial tape in each case elongated and broke, whereas there was no detectable damage to the tape of the invention. The superiority of the tape of the invention is even more pronounced when it is considered that the support of the invention was nearly 10% thinner than the poly(ethylene terephthalate) support in this test.

Laboratory creep tests in tension were performed on the two tapes referred to in the previous tests. A specially-built laboratory apparatus was used, in which the film sample was stretched between a fixed clamp and a ½-in. diameter mandrel, with load applied by weights attached to the periphery of a 4-inch diameter pulley mounted on the mandrel. Extension of the film was read from graduations on the pulley. A stress of 10,000 p.s.i. was used, based on a test in Interim Federal Specification W–T–0061 (Navy Ships) requiring a 2½-lb. load for ¼-in. polyester sound tapes, equal to a stress of 10,000 p.s.i. on 1-mil film. Load was applied to 6-in.-gage-length specimens for 180 min., at which time the extension was measured and the load removed. The specimen was allowed to recover 180 min. with no load and the residual extension determined. Results expressed as percent strain are summarized in Table 2 below.

*Table 2.—Creep test*

| | Tape Width, in. | Approximate Thickness of Tape After Removal of Coating, mil. | Creep Tests, 10,000 p.s.i. Stress | |
|---|---|---|---|---|
| | | | Percent Strain After 180 min. | Percent Unrecovered Strain, 180 min. After Load Removal |
| Commercial poly(ethylene terephthalate) tape. | ¼ | 1.0 | 1.88 | 0.25 |
| | | | 1.78 | 0.22 |
| Tape of Invention | ¼ | 0.9 | 1.30 | 0.15 |
| | | | 1.56 | 0.20 |
| | | | 1.60 | 0.15 |

The advantages accruing to the tape of the invention are readily apparent from its much lower creep under load and much lower residual creep after load removal as shown in the table and for reasons hereinabove discussed in detail.

It should be pointed out in connection with the polyesters employed as the support materials for the magnetic tape of our invention that not all polyesters are suitable as a magnetic tape support. In particular, not all polyesters derived from terephthalic acid are suitable for this purpose. For example, it is well known that quinitol terephthalates are not suitable for the manufacture of films or similar support material. The polyester derived from the trans form of the glycol has a high-melting point but decomposes at or below the melting point. The polyester derived from the cis form of the glycol has a low melting point and is amorphous. Moreover, terephthalate polyesters of many glycols of the formula $$HO(CH_2)_nOH$$

are of no value for magnetic tape, e.g. where $n$ is 7 or 9. Thus, poly(heptamethylene terephthalate) having an inherent viscosity of 0.84 was prepared and stretched 3.7× lengthwise and 1.5× widthwise but could not be heat set at 150° C. since it melted at below 100° C. A similar result was found with poly(nonamethylene terephthalate). On the other hand, the polyesters employed in accordance with the present invention do not suffer from these deficiencies and are found to be suitable for use as magnetic tape support.

As is apparent from Example 1, the preceding tables and the above discussion, the tapes of this invention possess an unobvious combination of (1) the essential attributes of cellulosic-based tapes, (2) the essential attributes of poly(ethylene terephthalate) tapes, and (3) other unexpected attributes. This invention overcomes various deficiencies of these other magnetic tapes.

This invention provides magnetic tapes with a high tensile strength in the lengthwise direction (41,600 in Table 1A and 45,500 in Table 1B) which is necessary because of the inertial effects brought about, for example, by starting fast rewinding of a tape especially when a free loop is eliminated with a jerk. It is also necessary, however, to avoid permanent elongation when such jerks occur since such elongation will distort the magnetic recording on the tape. This invention provides a tape with excellent longitudinal tensile strength but with the desirable ability to break rather than undergo a permanent elongation. Such breaks can be repaired by splicing but are relatively rare due to the high tensile strength. The tape of this invention is much stronger than cellulosic based tapes and will also sustain high tension as will poly(ethylene terephthalate) tapes without undergoing the undesired permanent elongation of the latter (33,500 in Table 1A and 29,000 in Table 1B).

The tapes of this invention not only have very high lengthwise tensile strength in tests at ordinary testing rates, i.e. 50–100% per minute, but also have unexpectedly improved tensile strength at high testing rates (see Table 1). At the break point the tapes of this invention have tolerable elongations on the order of 35% or less (31% in Table 1A and 30% in Table 1B), whereas poly (ethylene terephthalate) tapes have undesirably high elongations as high as 100% or even higher (137% in Table 1A and 142% in Table 1B).

In addition to tensile strength, the tapes of this invention have high lengthwise tensile modulus values (7.5 in Table 1A and 8.3 in Table 1B). The higher the modulus, the greater is resistance to elastic change under various tensions. These modulus values are about the same as for PET, i.e. poly(ethylene terephthalate) tapes, at ordinary testing rates (7.6 for PET in Table 1A) and are much superior to the latter at higher testing rates (6.9 for PET in Table 1B).

Besides these factors, the magnetic tapes of this invention have unexpectedly low values for creep under load (time-dependent deformation). Tapes which creep tend to grow longer and longer with each playing which is obviously undesirable for radio, television, or other purposes. The tapes of this invention are superior to poly(ethylene terephthalate), i.e. PET tapes, as regards creep under load and residual creep after load removal. Table 2 shows that PET had a residual creep of 0.22 to 0.25% whereas the tape of this invention had a residual creep of only 0.15 to 0.20%.

Similar attributes are shown in Tables 3, 4 and 5 hereinbelow. Moreover, Table 5 shows that the tapes of this invention have unexpectedly high widthwise modulus which is a great advantage in reducing guiding problems in winding and rewinding tapes, especially at high speeds.

Moreover, the tapes of this invention are also superior to poly(ethylene terephthalate) tapes as regards dimensional stability under varying conditions of humidity and temperature.

Furthermore, the tapes of this invention are more easily coated than poly(ethylene terephthalate) and thus share this advantage of a cellulosic-based tape while having the other superior properties already described.

It should be emphasized that the tapes of poly(1,4-cyclohexylenedimethylene terephthalates) covered by the present invention have their especially advantageous attributes as a result of a unique process of orientation. The most noteworthy difference as compared to the prior art is that the widthwise adjustment is specified as being from about 0.95 to about 1.3 times, i.e. from essentially no stretch up to about a 30% stretch.

Various published disclosures including such patents as Alles, U.S. 2,884,663 granted May 5, 1959 and Amborski, U.S. 2,975,484, granted March 21, 1961, disclose magnetic recording tapes based upon poly(ethylene terephthalate). Kibler et al., U.S. 2,901,466, granted August 25,1959 (mentioned above), disclose various polyesters of 1,4-cyclohexanedimethanol and disclose films and fibers thereof which have improved properties over poly(ethylene terephthalate) as regards such properties as melting point, sticking temperatures, dyeability, weathering stability and heat-distortion temperatures. Kibler et al. do not mention magnetic recording tapes, nor recognize that magnetic coatings can be applied with much greater ease than when applied to poly(ethylene terephthalate). Moreover, Kibler et al. do not specify what kind of biaxial orientation, is contemplated nor that the widthwise stretching could be zero. Hence those skilled in the art would presume an approximately 3× by 3× biaxial orientation as is commonly used for poly(ethylene terephthalate), see Scarlett U.S. Patent No. 2,823,421 as well as the above cited Alles and Ambroski patents.

Nowhere do Kibler et al. suggest that their film can advantageously be asymmetrically oriented, nor that it would then have properties combining (*a*) high tensile strength (*b*) high modulus in the lengthwise direction, (*c*) low elongation at break, (*d*) high elongation at yield, (*e*) low creep under load, (*f*) low residual creep after load removal, and (*g*) high widthwise modulus. Perhaps the most advantageous combination of such properties is (1) lower elongation at break, (2) higher elongation at yield, and (3) higher widthwise modulus, the latter two advantages being particularly unique and unexpected.

The achievement of these advantages in a particular polyester film by means of the employement of very little, if any widthwise stretch, according to the present invention, is not suggested by disclosures such as the Amborski patent which indicates that the minimum amount of stretch performed on the amorphous film in each direction is critical and the film must be stretched at least 1.5× in one direction and at least 3.7× in the transverse direction. Such disclosures do not provide nor even suggest the achievements of the present invention combining the advantages mentioned above. Many other disclosures such as the Alles patent are even less relevant since they provide for superstretching an already biaxially oriented film which had been stretched according to standard practices in both directions about 3.0× by 3.0× and heat set.

In contrast, the present invention in its preferred range covers values of from about 1.0 to about 1.1 times widthwise. Example 1 hereinabove illustrates 1.02× widthwise stretch. Thus, disclosures such as the Ambroski patent warn against attempting to stretch less than the minimum amounts that are specified in order to avoid causing the film to fibrillate; i.e. the avoidance of fibrillation is said to not be possible when amorphous terephthalate ester films are unidirectionally stretched about 4.0× to 5.0×. The present invention establishes that such a teaching has its unexpected exceptions as regards films of terephthalate polyesters where the glycol is 1,4-cyclohexanedimethanol.

Polyester films having some utility as a magnetic recording tape base have been mentioned on many occasions in the prior art beginning with the original Carothers work on polyesters, cf. U.S. 2,071,250 and U.S. 2,216,736. The later invention set forth in Whinfield et al. U.S. 2,465,319 established that polyesters of terephthalic acid had higher melting points so that synthetic fibers could be produced which could be made into fabrics which could be ironed or pressed without melting or sticking to the hot iron. The Kibler et al. Patent U.S. 2,901,466 cited hereinabove provides still higher melting points which are especially useful as regards fabrics but of no noteworthy significance as regards magnetic recording tapes. The same lack of pertinence applies to other advantages recited by Kibler et al.

Since Carothers first disclosed the film utility of polyesters there have been hundreds of patents issued which disclose countless species of such polyesters. As an example of a terephthalate polyester which is not susceptible to the treatment described by above cited Amborski patent, reference is made to the terephthalate polyester derived from quinitol which is mentioned above in the present specification. Another example of a terephthalate polyester which does not produce advantageous magnetic tape is the polyester derived from equimolecular amounts of 1,4-sulfonylbis(benzoic acid) and the terephthalic acid condensed with ethylene glycol.

As has already been pointed out, it is highly desirable that any breakage of magnetic tape be characterized by a clean break, as opposed to a permanent stretch prior to break, in order to permit splicing with no loss or deterioration of program material. This is a serious defect in existing tapes on poly(ethylene terephthalate) support; after yielding they stretch into what resembles a wire, before breaking. There is consequent permanent loss of program material and change of playing time after the elongated portion is cut out and the tape spliced. It is accordingly considered highly desirable to have a tape support with as low an elongation at break as possible. In Examples 2 and 3 below, it is further shown that films of this invention are greatly superior in this respect to similarly prepared films of poly(ethylene terephthalate). Moreover, the data in Example 3 below also show a quite unexpected result for the films of this invention: viz, they have higher elongation at yield than do the poly(ethylene terephthalate) films. It can readily be appreciated that a high lengthwise yield elongation is desirable in a tape support, inasmuch as permanent distortion takes place only after the film has yielded. In fact, the ideal tape support would be one which had as high a yield elongation as possible but broke almost immediately after yield. It is seen from the data in Example 3 that the films of this invention come close to realizing this ideal behavior in having a very high elongation at yield but a very low elongation at break.

A further quite unexpected advantage of the film of this invention over comparable poly(ethylene terephthalate) films is the high widthwise modulus of our film, as further shown in Example 4 below. Inasmuch as stiffness of a film of a given thickness is directly proportional to its modulus, it is apparent that a high widthwise modulus is an advantage in eliminating guiding problems. These arise particularly with very thin tapes because the tape edge may not be stiff enough to respond to the edge guiding. In winding and rewinding of a tape, it is highly desirable that the tape follow the edge guides and avoid "riding up" against the flanges of the take-up reel, since such riding up could obviously lead to tape damage.

EXAMPLE 2

Substantially amorphous film of the linear polyester of Example 1 was prepared by extruding the polyester through an orifice in the form of a film onto the surface of a polished quench roll. Substantially amorphous poly(ethylene terephthalate) film was similarly prepared. Film corresponding to this invention was then prepared by stretching film 4.0 times in the lengthwise direction (L.D.) at a temperature of 99–100° C. by means of a film stretching machine and then heat setting the film for ½ minute at a temperature of 215° C. while the film was clamped to prevent any film shrinkage. Film was also prepared by stretching amorphous poly(ethylene terephthalate) 4.0 times lengthwise at a temperature of 88–92° C. and heat setting it for ½ minute at 215° C. The difference in stretching temperatures for the two polyesters was necessary because of the known higher second order or glass transition temperature for the film of this invention as measured for example by differential thermal analysis, and described in the paper, "Properties of a New Polyester Film," by M. T. Watson, Soc. Plastics Engrs. Journal, vol. 17, pp. 1086–1087 (1961). The glass transition of polymers and its measurement by differential thermal analysis are well known to workers in polymer chemistry, and it is also known that for amorphous polymers stretching should be carried out above the glass-transition temperature in order to effect orientation. Film samples were also prepared from the film of this invention and from poly(ethylene terephthlate) as described above except that a simultaneous stretch of 4.0 times in L.D. and 1.25 times in the transverse or widthwise direction (W.D.) was used.

Tensile properties of these films in the lengthwise directions were measured as described hereinabove and are set forth in Table 3 below:

*Table 3*

| Film | Stretch (L.D. x W.D.) | Tensile Strength (p.s.i.), L.D. | Elongation (percent), L.D. |
|---|---|---|---|
| Polyester of this invention | 4.0 x 1.0 | 36,400 | 47 |
| Poly(ethylene terephthalate) | 4.0 x 1.0 | 36,600 | 108 |
| Polyester of this invention | 4.0 x 1.25 | 28,200 | 30 |
| Poly(ethylene terephthalate) | 4.0 x 1.25 | 40,000 | 111 |

The substantially lower elongations of the films of this invention in the above Table 3 constitute advantages for magnetic tape support as already discussed.

EXAMPLE 3

Films of this invention were prepared from the polyester of this invention exactly as described in the first paragraph of Example 1 of this application except that amounts of longitudinal stretch of 4.25, 4.50, 4.75 and 5.0 times (in the L.D.) were used. The films were then heat-set at about 200° C. under tension sufficient to prevent any film shrinkage. Amorphous films of poly(ethylene terephthalate) were longitudinally stretched to the same amounts in like manner and were also heat-set. Tensile properteis of these films in the L.D. are listed in the table below:

*Table 4*

| Film | Stretch (L.D. x W.D.) | Yield Strength (p.s.i.), L.D. | Elong. (at Yield, percent), L.D. | Tensile Strength (at Break, p.s.i.), L.D. | Elong. (at Break, percent), L.D. |
|---|---|---|---|---|---|
| Polyester of this invention | 4.25 x 1.0 | 19,100 | 4.9 | 33,100 | 18 |
| Poly(ethylene terephthalate) | 4.25 x 1.0 | 24,200 | 4.0 | 49,500 | 54 |
| Polyester of this invention | 4.50 x 1.0 | 23,900 | 5.3 | 35,800 | 14 |
| Poly(ethylene terephthalate) | 4.50 x 1.0 | 29,100 | 4.3 | 52,900 | 45 |
| Polyester of this invention | 4.75 x 1.0 | 29,700 | 5.9 | 39,500 | 11 |
| Poly(ethylene terephthalate) | 4.75 x 1.0 | 32,800 | 4.4 | 51,700 | 29 |
| Polyester of this invention | 5.0 x 1.0 | 37,700 | 6.4 | 44,500 | 9 |
| Poly(ethylene terephthalate) | 5.0 x 1.0 | 37,700 | 4.8 | 63,500 | 33 |

It can be seen from Table 4 that the films of this invention approach "ideal" behavior as regards breaking of magnetic tape support in that they have high elongations at yield and low elongations at break. In both these respects, the film of this invention is substantially superior to similarly prepared films of poly(ethylene terephthalate). It should also be pointed out that the increasing tensile strengths at break with increasing L.D. stretch for the poly-(ethylene terephthalate) films of the above table are of no advantage for magnetic tape support because the yield strength of poly(ethylene terephthalate) is no better than that of the tape of this invention.

EXAMPLE 4

Films of this invention and films of poly(ethylene terephthalate) were prepared as in Example 3 above, but at L.D. stretch ratios from 4.0 to 4.75 times. Tensile modulus values of these films in the direction transverse to the stretch are listed in Table 5 below:

*Table 5*

| Film | Stretch (L.D. x W.D.) | Tensile Modulus (p.s.i.), W.D. |
|---|---|---|
| Polyester of this invention | 4.0 x 1.0 | 570,000 |
| Poly(ethylene terephthalate) | 4.0 x 1.0 | 350,000 |
| Polyester of this invention | 4.25 x 1.0 | 560,000 |
| Poly(ethylene terephthalate) | 4.25 x 1.0 | 320,000 |
| Polyester of this invention | 4.50 x 1.0 | 560,000 |
| Poly(ethylene terephthalate) | 4.50 x 1.0 | 320,000 |
| Polyester of this invention | 4.75 x 1.0 | 560,000 |
| Poly(ethylene terephthalate) | 4.75 x 1.0 | 320,000 |

These high widthwise modulus values for the films of this invention constitute a novel and quite unexpected advantage for magnetic tape support over similarly processed poly(ethylene terephthalate) films. The importance of a high W.D. modulus as leading to desirably high widthwise stiffness and thereby reducing edge guiding problems with magnetic tape has already been discussed.

Although the invention has been described in considerable detail with particular reference to certain preferred embodiments thereof, variations and modifications can be effected within the spirit and scope of the invention as described hereinabove, and as defined in the appended claims.

We claim:

1. An improved magnetic recording tape comprising a thin layer of a magnetically susceptible material dispersed in a nonmagnetic binder coated on a flexible support consisting essentially of an asymmetrically oriented high-melting linear polyester of substantially equimolar proportions of a dicarboxylic acid and 1,4-cyclohexanedimethanol, said dicarboxylic acid being essentially composed of terephthalic acid which support in its amorphous form has been solely oriented by a process consisting of longitudinal stretching in the range of from about 2.5 to about 5.5 times and establishing the widthwise dimension within the range of from about 0.95 to about 1.3 times the width of the longitudinally stretched support, said support being characterized in that it has (1) a percentage of elongation at break no greater than about 35% and (2) a percentage of elongation at yield of at least 4.9%.

2. A tape as defined by claim 1 wherein the oriented support has been heat-set at a temperature within the range of from about 150° to about 250° C.

3. A tape as defined by claim 1 wherein the polyester has been longitudinally stretched within the range of from about 3.5 to about 4.5 times, has been established widthwise within the range of from about 1.0 to about 1.1 times and has been heat set within the range of from about 180° C. to about 230° C.

4. A tape as defined by claim 1 wherein the terephthalic acid constituent of the polyester is replaced with up to 25 mole percent thereof of isophthalic acid.

5. A tape as defined by claim 3 wherein the terephthalic acid constituent of the polyester is replaced with from about 5 to about 25 mole percent thereof of isophthalic acid.

6. A tape as defined by claim 2 wherein the amorphous form has been solely oriented by lonigtudinal stretching which thereby establishes the widthwise dimension.

References Cited by the Examiner

UNITED STATES PATENTS

| | | | |
|---|---|---|---|
| 2,823,421 | 2/1958 | Scarlett | 264—40 |
| 2,884,663 | 5/1959 | Alles | 264—288 |
| 2,901,466 | 8/1959 | Kibler et al. | 260—75 |
| 2,968,065 | 1/1961 | Granholz | 12—38 |
| 2,975,484 | 3/1961 | Amborski | 241—91 |
| 2,991,198 | 7/1961 | Abeck et al. | 117—138.8 |
| 3,021,229 | 2/1962 | Morgan | 117—138.8 X |
| 3,068,528 | 12/1962 | Owens | 264—289 |
| 3,165,499 | 1/1965 | Alles | 264—289 X |
| 3,177,277 | 4/1965 | Adams et al. | 264—289 X |

WILLIAM D. MARTIN, *Primary Examiner.*

W. D. HERRICK, *Assistant Examiner.*